(12) United States Patent
Vo et al.

(10) Patent No.: US 7,168,992 B2
(45) Date of Patent: Jan. 30, 2007

(54) WIRE TERMINATION DEVICE HAVING TEST CONTACTS ON COVER

(75) Inventors: Chanh C. Vo, Arlington, TX (US); Brad N. Grunwald, Euless, TX (US)

(73) Assignee: Corning Cable Systems, LLC, Hickory, NC (US)

( * ) Notice: Subject to any disclaimer, the term of this patent is extended or adjusted under 35 U.S.C. 154(b) by 0 days.

(21) Appl. No.: 09/840,482

(22) Filed: Apr. 23, 2001

(65) Prior Publication Data

US 2002/0155745 A1    Oct. 24, 2002

(51) Int. Cl.
*H01R 24/00* (2006.01)
(52) U.S. Cl. .................................. 439/676; 379/413.04
(58) Field of Classification Search ................ 439/482, 439/489, 676, 912, 399, 404; 379/413.01, 379/413.02, 413.03, 413.04, 399
See application file for complete search history.

(56) References Cited

U.S. PATENT DOCUMENTS

| | | | | |
|---|---|---|---|---|
| 4,201,432 A | * | 5/1980 | Chalmers ..................... | 439/82 |
| 4,626,633 A | * | 12/1986 | Ruehl et al. .................. | 379/27 |
| 4,979,209 A | * | 12/1990 | Collins et al. ............... | 379/399 |
| 5,153,910 A | * | 10/1992 | Mickelson et al. ......... | 379/399 |
| 5,297,199 A | * | 3/1994 | Graham et al. ............. | 379/399 |
| 5,497,416 A | * | 3/1996 | Butler, III et al. .......... | 379/399 |
| 5,548,641 A | * | 8/1996 | Butler et al. ................ | 379/399 |
| 5,971,795 A | * | 10/1999 | Daoud et al. ............... | 439/409 |
| 6,149,458 A | * | 11/2000 | Daoud ........................ | 439/509 |
| 6,188,560 B1 | * | 2/2001 | Waas .......................... | 361/119 |

* cited by examiner

*Primary Examiner*—Thanh-Tam Le
(74) *Attorney, Agent, or Firm*—Keith A. Roberson

(57) ABSTRACT

A wire termination device, such as a protected termination device ("PTD"), is provided for establishing and testing telephone wiring connections. Conductive contacts provided on the cover of the PTD are incorporated into a plug assembly mounted on the cover. The plug assembly is then brought into engagement with the jack of the PTD when the cover is closed. A preferred embodiment of the plug assembly incorporates laterally disposed bypass contacts that are brought into engagement with conductive plates within the jack. An alternative embodiment of the plug assembly has conductive contacts that are brought into contact with the tip and ring contacts of the jack when the cover is closed. In either case, test contacts are accessible through the cover of the PTD so that the cover of the PTD can be opened and closed without having to disconnect and reconnect the test probes from the test contact points.

14 Claims, 5 Drawing Sheets

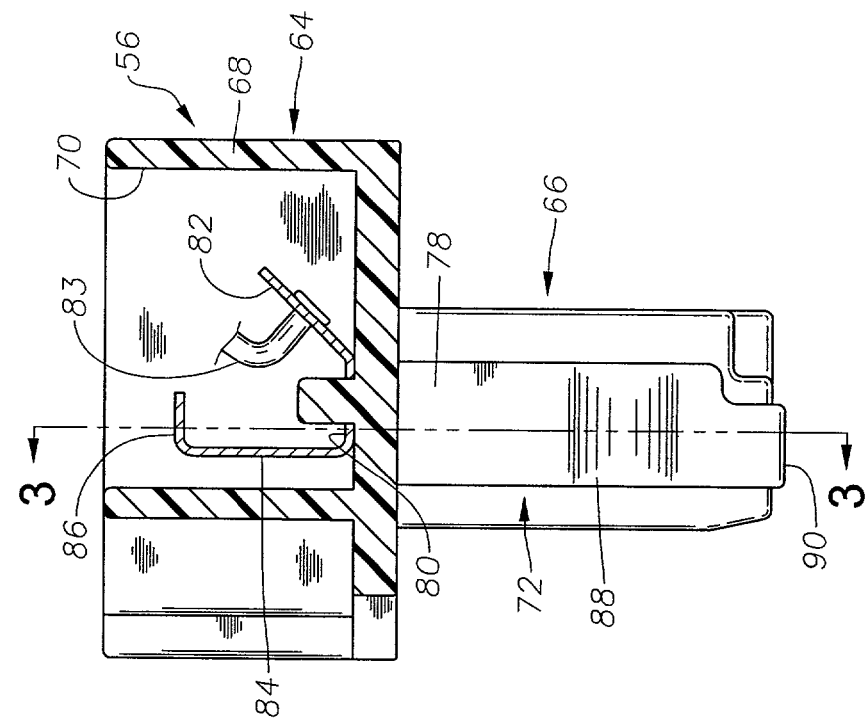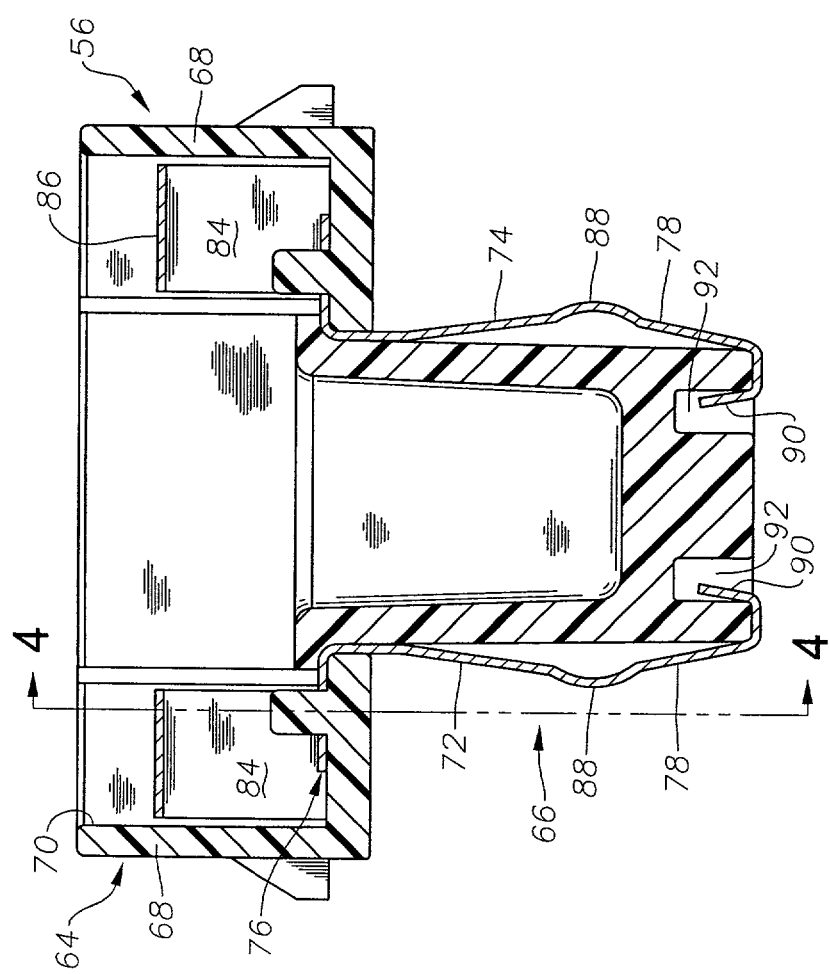

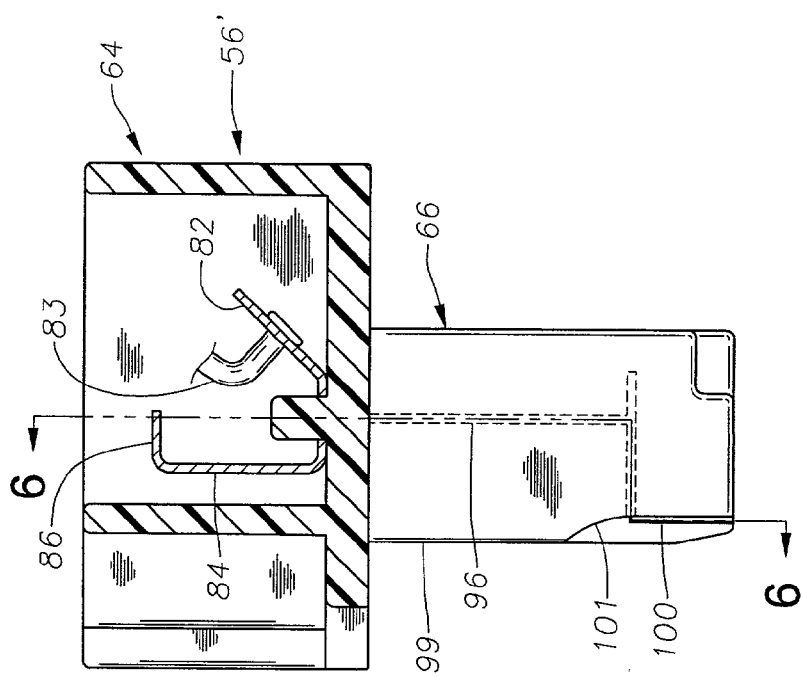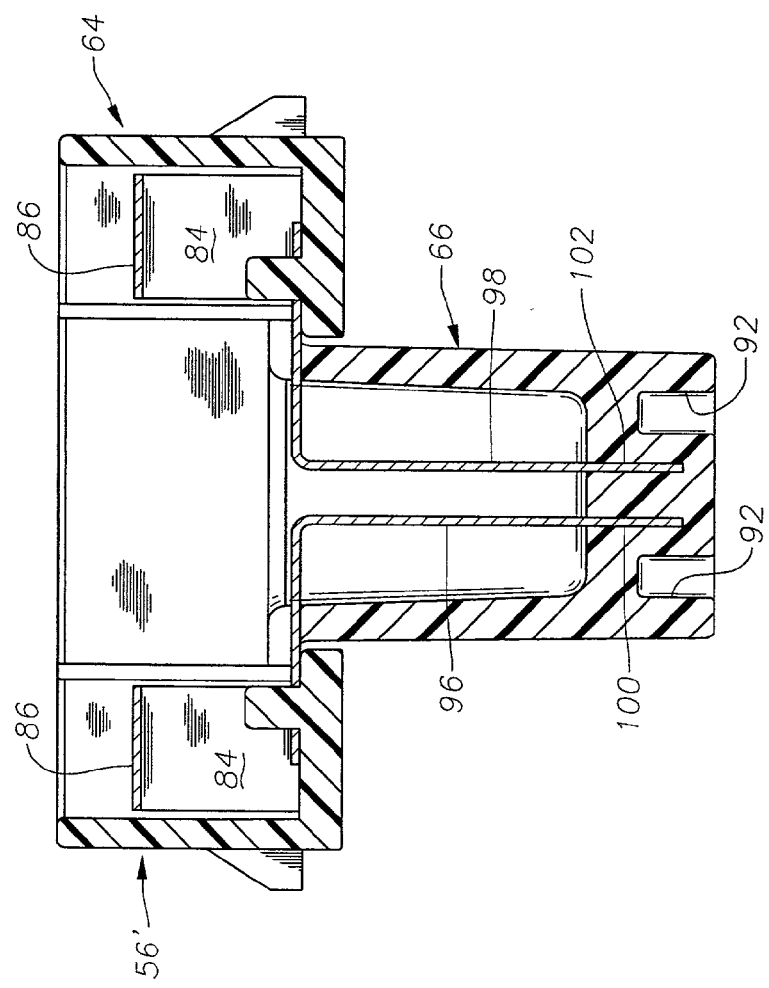

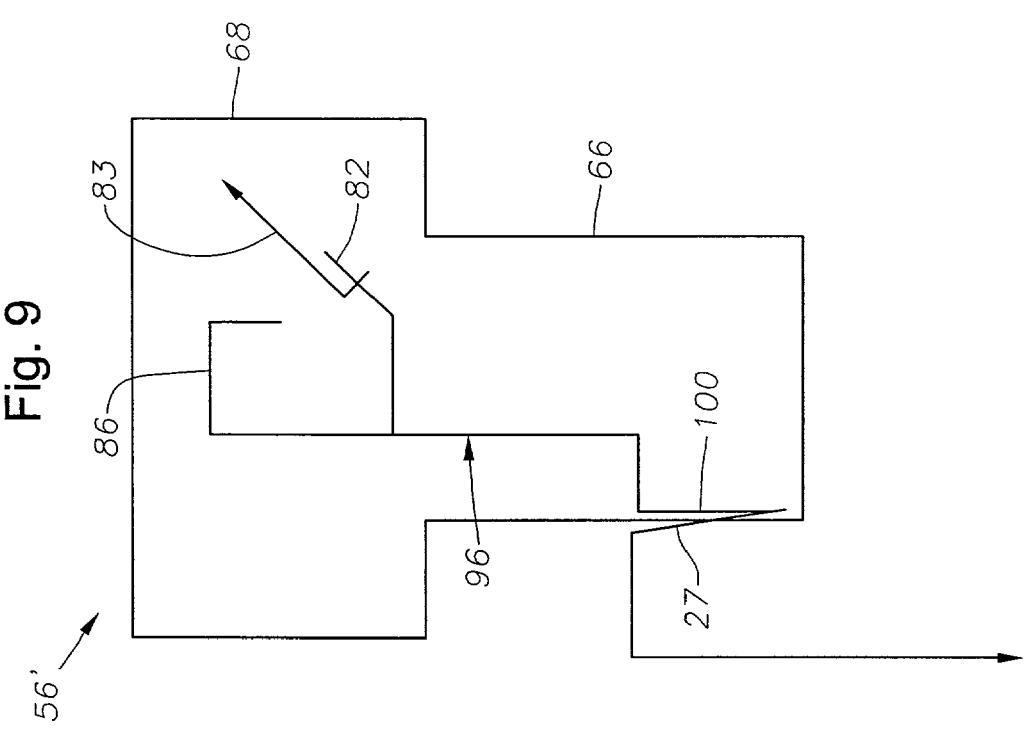
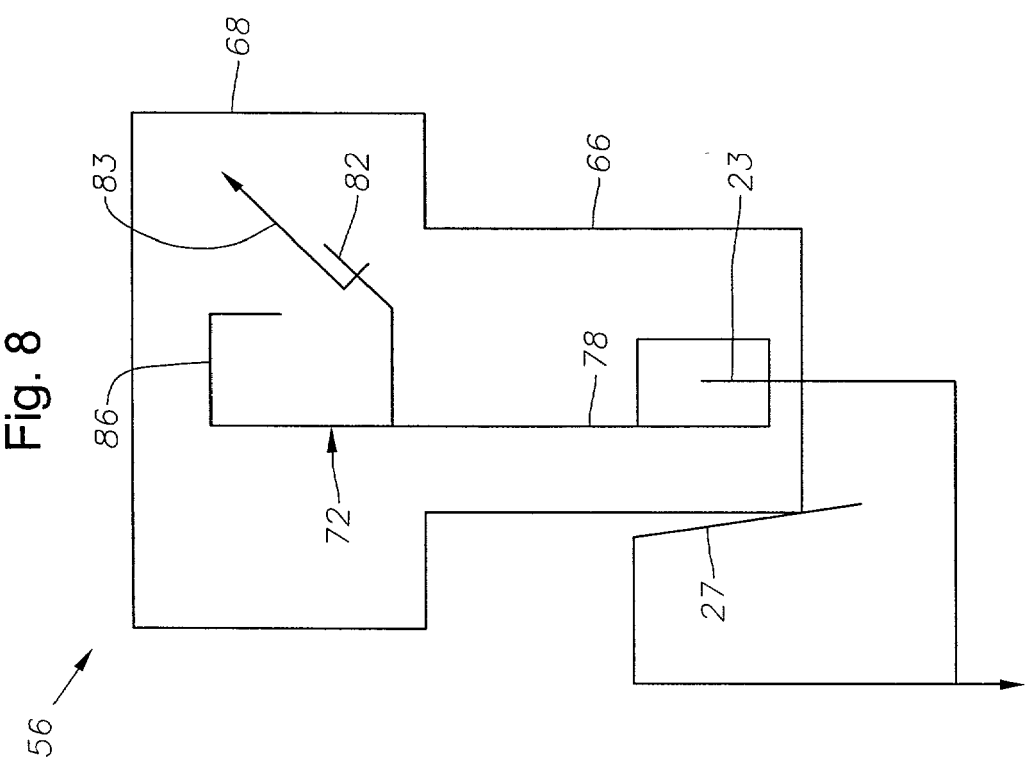

WIRE TERMINATION DEVICE HAVING TEST CONTACTS ON COVER

FIELD OF THE INVENTION

The present invention is directed to wire termination devices, such as protected terminal devices and line modules, that are used in telephone network interface devices. In more particular aspects, the invention relates to devices and methods for testing the telephone wiring connections that are established by such devices.

BACKGROUND OF THE INVENTION

Telephone network interface devices ("NIDs") provide a demarcation, or interface, between external telephone company lines and a subscriber's internal wiring. The NID contains a number of smaller components, typically line modules or protected termination devices ("PTDs"), within which telephone company and subscriber tip and ring wiring is physically interconnected. Each PTD contains a jack and subscriber terminals to which tip and ring wires are secured. There is also a hinged cover that protects the internal components. The cover includes a plug that is seated inside the jack when the cover is closed. Opening the cover removes the plug from the jack to allow a telephone handset to be connected to the telephone company wiring for testing.

An important operational aspect of PTD design is to enable the telephone company to test the wiring connections established by the PTD. Conventional PTDs dispose access holes referred to as test ports through rear portions of the cover at locations that are proximate the subscriber terminals. The test ports permit probes to be inserted through the cover and contact the terminals to verify telephone service to the NID. The test ports permit this testing to be done while the cover remained closed. An example of this arrangement is described in U.S. Pat. No. 5,548,641 issued to Butler et al., which is owned by the assignee of the present invention and is incorporated herein by reference in its entirety.

While the conventional test port arrangement affords an effective and reliable technique for testing wiring connections, an alternative arrangement is desired. Screw-type terminals, such as those depicted in U.S. Pat. No. 5,548,641, are being largely replaced in newer PTDs with insulation displacement connectors ("IDCs") to which the subscriber tip and ring wires are connected. In a particular design, the IDCs employ lever switches to connect and disconnect the wiring. Viewing windows are placed in the cover over each of the switches so that the position of the lever can be easily seen without opening the cover. In addition, labeling is placed on the cover that indicates the lever is in either a connected or disconnected state. The presence of the windows and the labeling on the cover leaves insufficient room for test ports to be disposed through the cover.

The present invention addresses this problem presented by the use of PTDs provided with lever activated IDCs.

SUMMARY OF THE INVENTION

The invention provides devices and methods for improved testing of telephone wiring connections in PTDs and similar wire termination devices. An exemplary PTD is described that incorporates test ports and electrical test contacts into the cover of the PTD. In the preferred embodiments described herein, the test contacts are partially incorporated into the plug assembly that is housed in the cover. The test contacts are then brought into engagement with the jack of the PTD when the cover is closed onto the base of the PTD. Two exemplary plug assemblies are described that incorporate test contacts that complete an electrical circuit when the cover is closed. The first plug assembly incorporates laterally located bypass contact members mounted to the plug that are brought into contact with conductive plates within the jack when the cover is closed. The conductive plates are electrically connected to the wire contacts of the jack. The second plug assembly has test contacts that are brought into contact with the tip and ring wire contacts of the jack when the cover is closed. In each case, access holes for the test ports are located on the cover of the PTD.

The devices and methods of the present invention are advantageous. The test contacts are located within the cover of the PTD rather than the bridge. Thus, the cover of the PTD can be opened and closed without having to disconnect and reconnect the test probes from the test contacts. Further, the devices and methods of the invention are conducive to the use of IDCs since sufficient areas of the cover will be available for viewing windows and labeling to be placed thereon.

BRIEF DESCRIPTION OF THE DRAWINGS

FIG. 3 is a lateral cross-sectional view taken along lines 3—3 in FIG. 4 of a preferred embodiment of a plug assembly for use with the PTD of FIG. 1.

FIG. 4 is a partial cross-sectional view taken along lines 4—4 in FIG. 3 of the plug assembly of FIG. 3.

FIG. 6 is a lateral cross-sectional view taken along the lines 6—6 in FIG. 7 of an alternative embodiment of a plug assembly for use with the PTD of FIG. 1.

FIG. 7 is a partial cross-sectional view of the alternative plug assembly of FIG. 6.

FIG. 8 is a schematic electrical diagram showing the electrical connections provided by the plug assembly of FIGS. 3 and 4.

FIG. 9 is a schematic electrical diagram showing the electrical connections provided by the plug assembly of FIGS. 6 and 7.

DETAILED DESCRIPTION OF THE INVENTION

Figure 1:
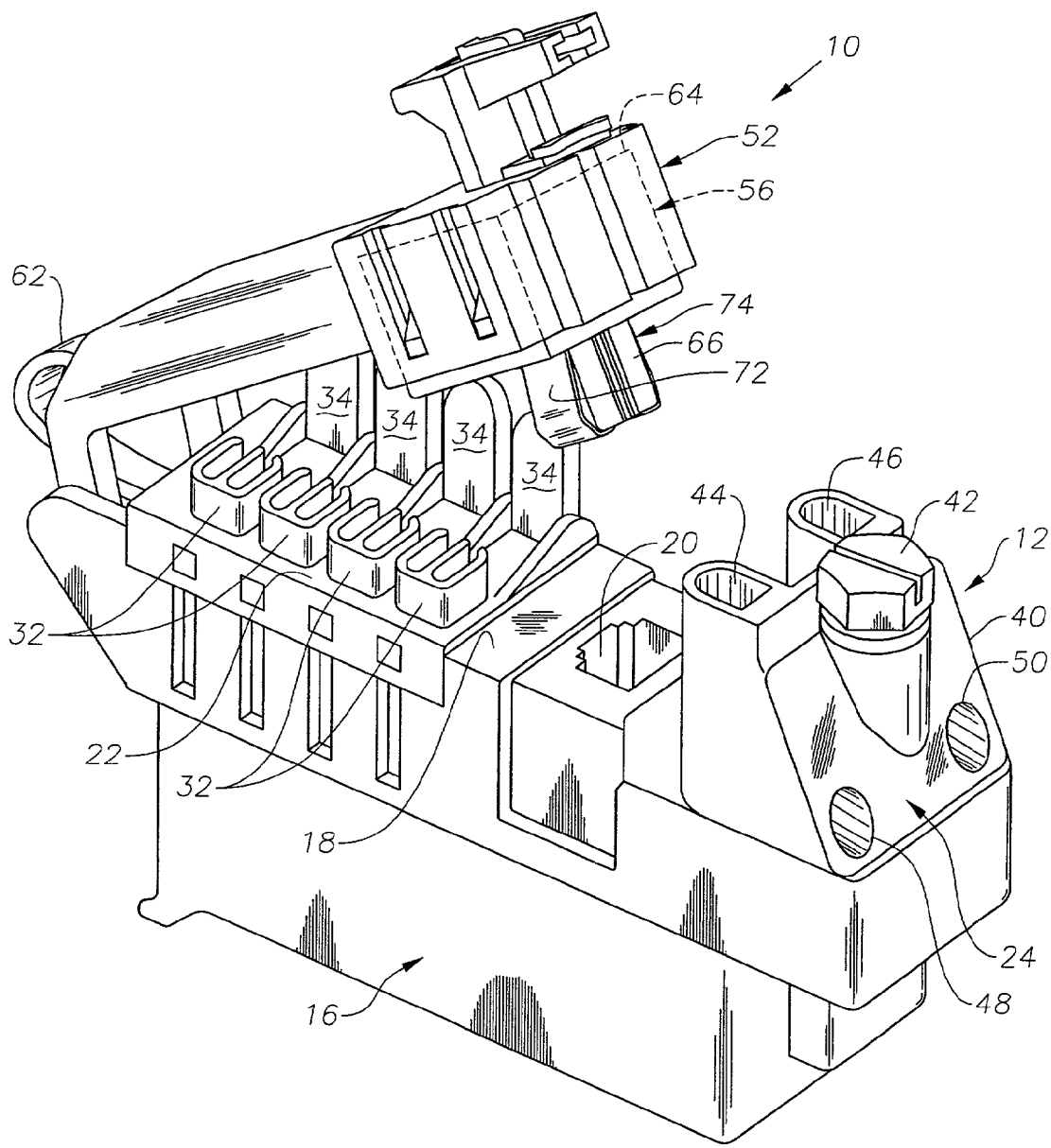
FIG. 1 is an isometric view of an exemplary PTD constructed in accordance with the present invention, with the cover shown in an open position.

FIG. 1 shows an exemplary PTD 10 of the type used within a NID. The PTD 10 includes a base 12 and a cover 14 that is hingedly affixed to the base 12. During use, the PTD 10 is typically disposed inside the compartment of a NID (not shown) along with a number of other PTDs of the same construction. The construction and operation of typical NIDs is well understood by those of skill in the art, and therefore, will not be described in further detail herein. It should be understood, however, that the invention has application to variants of wire termination devices other than standard telephone PTDs. Examples include flood-rated termination modules and line modules.

Figure 2:
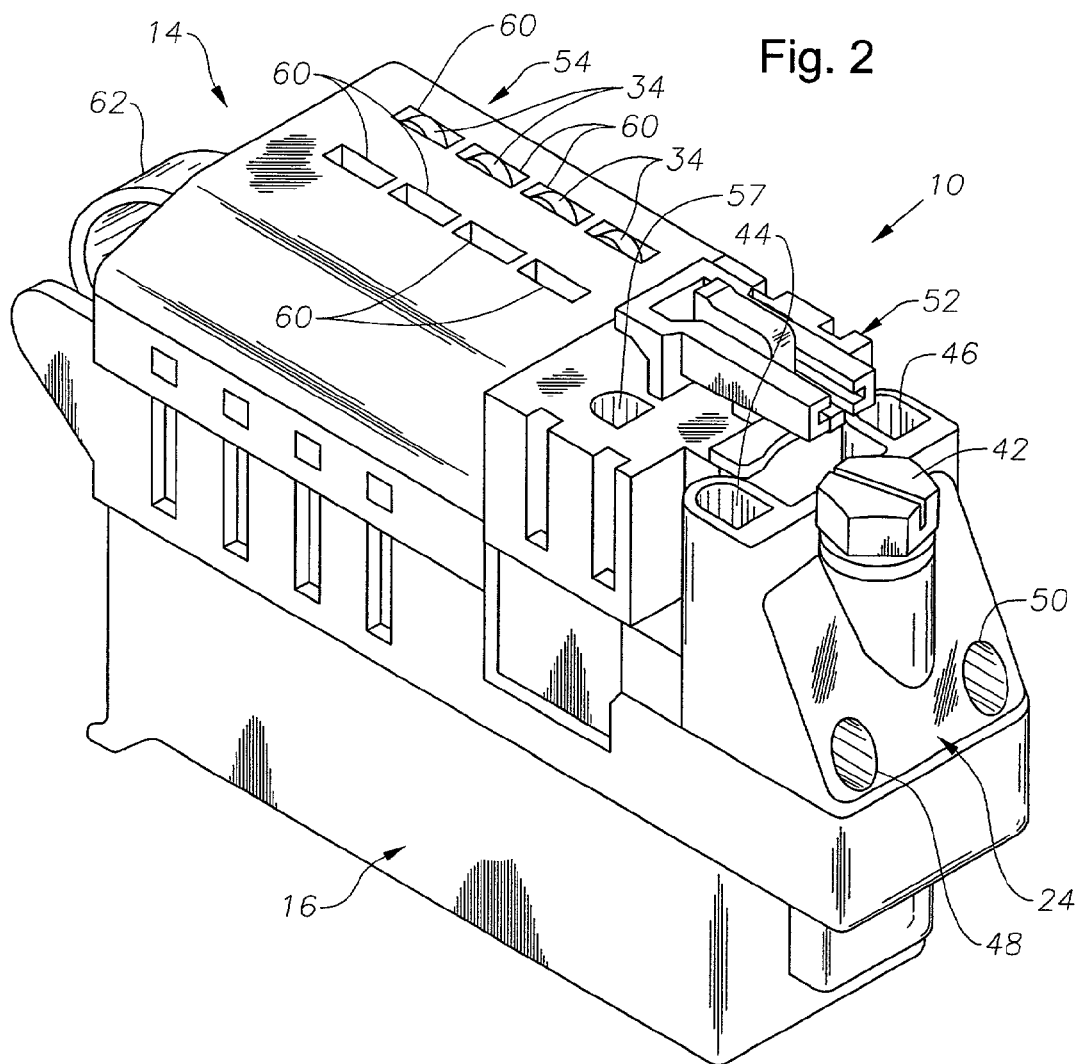
FIG. 2 is an isometric view of the PTD of FIG. 1, with the cover shown in a closed position.
Figure 2A:
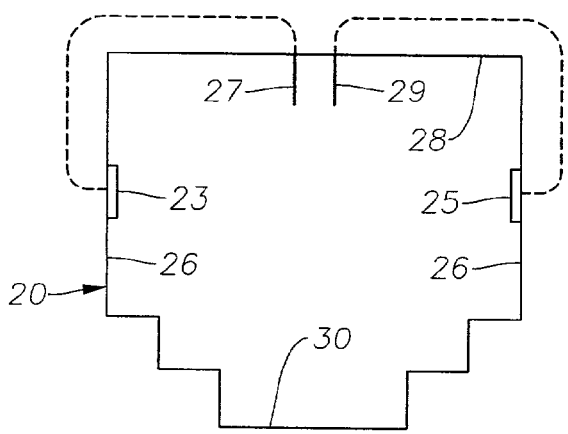
FIG. 2A is a schematic representation of the interior of the jack from the PTD shown in FIGS. 1 and 2.

The base 12 of the PTD 10 contains a lower compartment, generally indicated at 16, and a bridge 18 that is disposed atop the lower compartment 16. The lower compartment 16 houses a telephone circuit and protection, the details of which are not pertinent to the disclosure of the present invention. The lower compartment 16 also retains a RJ-11 jack 20 while the bridge 18 retains a terminal assembly 22. There is also a telephone company IDC assembly 24 at the forward end of the bridge 18. As the detail view in FIG. 2A shows, the jack 20 has a substantially rectangular receptacle with opposed lateral sidewalls 26 and forward and rearward sidewalls 28, 30, respectively. A pair of laterally located conductive plates 23, 25 are electrically interconnected with the tip and ring wiring contacts 27, 29, respectively, within the jack 20. Each conductive plate 23, 25 is located on a lateral sidewall 26 of the jack 20. The wiring contacts 27, 29 are located on the forward wall 28 of the jack 20.

Referring again to FIG. 1, the terminal assembly 22 of the bridge 18 includes a plurality (four shown) of individual IDCs 32 that function as the subscriber terminals. Each of the IDCs 32 includes receptacles that are shaped and sized to retain subscriber tip and ring wires (not shown). A set of four switches 34 on the bridge 18 is used to individually actuate the IDCs 32 to secure the subscriber tip and ring wires therein. These switches actuate each of the IDCs 32. The switches 34 are preferably longitudinal lever switches having a bright color, such as day-glow orange, so that they may be readily seen, even in low light or dark conditions.

The telephone company IDC assembly 24 includes a housing 40 that is secured to the bridge 18 by a screw 42. Telephone company tip and ring wires are connected to the telephone company IDC assembly 24 through wire insertion channels 48, 50 located on the forward surface of the housing 40 that lead to telephone company IDCs (not shown). The telephone company IDCs are typically electrically connected to a voltage or current protector element (not shown) and/or a telephone circuit (not shown), such as a half ringer, located in the lower compartment 16. The telephone company tip and ring wires are eventually interconnected to the subscriber tip and ring wires through the wiring contacts 27, 29 or the conductive plates 23, 25 in a well known manner. Access holes are provided in the top of housing 40 for a pair of telephone company wiring test ports 44, 46. Test contacts (not shown) leading from the test ports 44, 46 are electrically connected to the telephone company IDCs disposed within the housing 40 to permit the connections established by the telephone company IDCs to be tested in a conventional manner.

The cover 14 of the PTD 10 provides selective security for the jack 20 and terminal assembly 22. The cover 14 may be thought of as having a forward portion 52 and a rear portion 54, best shown in FIG. 2. The rear portion 54 provides a plurality of rectangular viewing windows 60 through which portions of the terminal assembly 22, and in particular the switches 34, are visible.

The forward portion 52 of the cover 14 defines a cavity that retains a plug assembly 56 (FIGS. 3 and 4). A pair of test probe access holes, or test ports 57 (one shown) are disposed within the upper surface of the forward portion 52 to permit access to the plug assembly 56 by test probes (not shown) from the exterior of the cover. The plug assembly 56 is electrically interconnected with the terminal assembly 22 of the bridge 18 by a cable 62. The cable 62 runs along the inside of the rear portion 54 of the cover 14 and then enters the base 12 below the bridge 18. The cable 62 contains tip and ring wires (not shown) that are electrically interconnected with the subscriber IDCs of the terminal assembly 22.

When the cover 14 is closed onto the base 12, the plug assembly 56 is thereby inserted into the jack 20 to establish electrical connections between the terminal assembly 22 and the telephone company tip and ring wires in a manner that will be described. This electrical connection is broken when the cover 14 is opened.

Referring now to FIGS. 3 and 4, a preferred embodiment of a plug assembly 56 is shown. The plug assembly 56 is generally formed of a non-conductive plastic or resin, except where specified below, and has an enlarged, box-shaped upper portion 64 with a downwardly protruding prong portion 66. The prong portion 66 is a standard RJ plug that is shaped and sized to engage tip and ring wiring contacts 27, 29 within the jack 20 when inserted therein and to deflect those contacts downwardly into contact with other conductive members (not shown) to form an electrical connection. The use of tip and ring wiring contacts 27, 29 in this manner is well known and understood, and therefore, will not be described further herein. The upper portion 64 of the plug assembly 56 has side walls 68 and presents an opening 70 therein.

Figure 5:
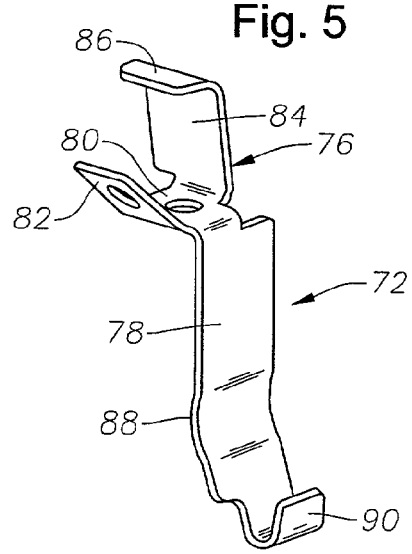
FIG. 5 is an isometric view of one electrical contact member of the plug assembly of FIGS. 3 and 4, shown apart from the plug assembly.

A pair of conductive test contacts, or bypass contacts, 72, 74 is integrally formed with the plug assembly 56 during fabrication. For clarity of explanation, a single bypass contact 72 is shown apart from the plug assembly 56 in FIG. 5. As FIG. 3 illustrates, bypass contact 74 is substantially a mirror image of bypass contact 72. Thus, it will be understood that the structure and operation of the bypass contact 72 applies as well to bypass contact 74. Like reference numerals will be used to designate like components as between the two contacts. As best shown in FIG. 5, bypass contact 72 includes an upper head portion 76 with a downwardly protruding leg 78. The head portion 76 includes a substantially horizontal plate 80 from which an adjoining angular plate 82 projects in a forward and upward direction. This angular plate 82 is used as a connecting portion to which either a tip or ring wire from the cable 62 is affixed. FIG. 4 shows an exemplary tip wire 83 affixed to the plate 82. It is noted that the tip and ring wires within the cable 62 electrically interconnect the bypass contacts 72, 74 to the terminal assembly 22, and thus, the terminal assembly 22 is electrically interconnected to the tip and ring contacts 27, 29 within the jack 20 when the cover 14 is closed.

A second adjoining plate 84 extends vertically upwardly from the rear of the horizontal plate 80. The upper end of the plate 84 presents a horizontal portion 86 that provides a test contact surface against which a test probe (not shown) may be placed. The leg 78 of each bypass contact 72, 74 is a metallic strip that is disposed along an outside lateral portion of the prong portion 66. Each leg 78 has an outwardly bent contacting section 88 and a curved lower end 90 that is received within recesses 92 formed in the lower tip of the prong portion 66. Each of the bypass contacts 72, 74 contacts one of the conductive plates 23, 25 within the jack 20 when the cover 14 is closed and thereby transmits current indicative of a successful connection into the upper portion 64 of the jack assembly 56. It is noted that there is no direct contact between the bypass contacts 72, 74 and the tip and ring wiring contacts 27, 29. Since the contacting section 88 of the leg 78 is biased outwardly away from the side wall 68 of the prong portion 66, a secure biasing engagement with the conductive plate 23 is assured. Test probes can determine whether a successful telephone connection has been established by contacting the test surfaces 86 of the bypass contacts 72, 74.

Referring now to FIGS. 6 and 7, an alternative embodiment of a plug assembly 56' is illustrated. The plug assembly 56' is similar in many respects to the plug assembly 56 described previously and, therefore, like reference numerals are used for like components. In this embodiment, the bypass contacts 72, 74 have been replaced by imbedded test contacts 96, 98 that extend through the prong portion 66 of the plug assembly 56'. The forward side 99 of the prong portion 66 is the side that will lie adjacent the forward wall 28 of the jack 20 when the prong portion 66 is inserted into the jack 20. As FIG. 7 shows, the forward side 99 of prong portion 66 has a lower cutaway 101 that presents exposed conductive portions 100, 102 of the test contacts 96, 98, respectively. The exposed conductive portions 100, 102 are located to contact the tip and ring wiring contacts 27, 29 within the jack 20 when the cover 14 is closed onto the base 16.

In operation, the electrical continuity of the telephone company and subscriber wiring connections may be tested by inserting or clipping test probes to the test contacts disposed within the test ports 57 provided on the cover to contact the test contact portions 86 disposed within the plug assembly 56 or 56'. If an electrical connection has been successfully made by insertion of the prong portion 66 within the jack 20, the test probe will detect the established circuits.

The devices of the present invention provide for test ports 57 to be located on the cover 14 and conductive test contacts 86 to be disposed within the cover 14 rather than the base 12 of the PTD 10. The particular preferred embodiments described herein associate the test contacts 86 with the plug assembly 56, 56' of the cover 14. As a result, the cover 14 of the PTD 10 can be opened and closed during testing. Therefore, the cover may be opened to make an adjustment to the position of any of the switches 34 while performing a test of the electrical connections without having to remove the test probes and then reattach them.

FIGS. 8 and 9 further illustrate the manner in which each of the plug assemblies 56, 56' establish electrical connections. In each case, when the cover 14 is closed onto the base 12 a telephone wiring connection is established, and the conductive test contacts 86 associated within each plug assembly 56, 56' will provide a positive electrical signal indicative of the established telephone wiring connection. FIG. 8 is a schematic depiction of the electrical wiring connections established within a PTD 10 that incorporates the plug assembly 56. FIG. 9 schematically depicts the electrical wiring connections established by the plug assembly 56'. It should be understood that, while only a single wiring connection is shown in each of FIG. 8 and FIG. 9, there will actually be two similar wiring connections made in each instance: one for the tip wires and one for the ring wires.

FIG. 8 illustrates the plug assembly 56 having been inserted into the jack 20 of the PTD 10. Tip wire 83 is shown leading away in the direction of the arrow to the subscriber terminal assembly 22 while the tip contact 27 within the jack is shown leading away in the direction of the associated arrow to a telephone company IDC that interconnects to the tip wire from the telephone company inserted in one of the wire insertion channels 48, 50. The leg 78 of the laterally located bypass contact 72 has been brought into contact with the conductive plate 23 within the jack 20. As noted previously, this conductive plate 23 is electrically interconnected with the tip contact 27 so that a connection with the plate 23 also forms a connection with the tip contact 27. In practice, it has been found that contacting a conductive plate, such as plate 23 within the jack 20, by a metallic bypass contact provides a superior electrical connection as well as a positive signal at the contact surface 86 indicative of a successful electrical connection.

FIG. 9 illustrates the plug assembly 56' having been inserted into the jack 20 of the PTD 10. It can be seen that the exposed conductive portion 100 of test contact 96 is placed into intimate surface contact with the tip contact 27. Otherwise, the operation and configuration of plug assembly 56' is identical to that of plug assembly 56 described above with reference to FIG. 8.

While the invention has been shown and described in only some of its forms, it should be apparent to those skilled in the art that it is not so limited, but is susceptible to various changes without departing from the intended scope of the invention.

What is claimed is:

1. A wire termination device for providing a demarcation with subscriber lines comprising:
   a) a base having a plurality of insulation displacement connector type subscriber terminals and a telephone jack having jack contacts for interconnection with the subscriber terminals;
   b) a moveable cover associated with the base to be selectively closed thereon; and
   c) a conductive contact provided on the cover that is disposed within the jack when the cover is closed onto the base, the conductive contact having a portion that electrically connects with the jack contacts when the cover is closed, the conductive contact also being accessible from the exterior of the cover for providing a test contact against which a test probe may be placed to detect electrical connections established by the wire termination device while the cover is closed.

2. The wire termination device of claim 1 wherein the conductive contact is recessed within a cavity disposed on a forward portion of the cover.

3. The wire termination device of claim 1 wherein the cover comprises a plug assembly having a prong portion and wherein the conductive contact comprises:
   a bypass contact that is disposed upon an outer surface of the prong portion and positioned to avoid contact with the jack contacts; and
   wherein the jack has a conductive member therein that is engaged by the bypass contact when the cover is closed, the conductive member being electrically connected to one of the jack contacts.

4. The wire termination device of claim 1 wherein the cover comprises a plug assembly having a prong portion and wherein the conductive contact comprises:
   a metallic strip disposed along a side of the prong portion and having an outwardly biased portion; and
   wherein the jack has a conductive member on a lateral sidewall that is engaged by the metallic strip when the cover is closed, the conductive member being electrically connected to one of the jack contacts.

5. The wire termination device of claim 1 wherein the cover comprises a plug assembly having a prong portion and wherein the conductive contact extends to a lower side of the prong portion and is positioned to physically contact at least one of the jack contacts when the cover is in the closed position.

6. A wire termination device comprising:
   a base having a subscriber terminal assembly thereupon comprising a pair of insulation displacement connector type subscriber terminals;
   a jack containing tip and ring contacts for establishing electrical connections with the subscriber terminals;

a movable cover for the base, the cover having a plug portion that is removably inserted into the jack when the cover is closed onto the base; and a pair of conductive contacts provided on the cover, each of the conductive contacts being electrically interconnected with the subscriber terminals and presenting a test contact extending through the cover for placement of a test probe thereon.

7. The wire termination device of claim 6 further comprising a pair of test probe access holes in the cover to permit the test probe to contact each test contact.

8. The wire termination device of claim 6 wherein the jack further contains a pair of conductive plates that are electrically interconnected with the tip and ring contacts.

9. The wire termination device of claim 8 wherein the conductive contacts each comprise a bypass member having a leg that is brought into contact with one of the conductive plates of the jack when the cover is closed onto the base.

10. A wire termination device comprising:

a base having at least a pair of insulation displacement connector subscriber terminals and a telephone jack disposed thereon, the jack having jack contacts for electrical connection with the subscriber terminals;

a cover movably attached to the base to be selectively closed thereon; and conductive contacts provided on the cover that are disposed within the jack when the cover is closed onto the base, the conductive contacts having a first portion that extends outwardly from the cover and electrically connects with the jack contacts in the jack when the cover is closed and a second portion opposite the first portion that extends through the cover to define a test probe and electrically connects with the subscriber terminals on the base.

11. A wire termination device comprising:

a) a base having a telephone jack with tip and ring contacts for establishing a telephone wiring connection;

b) a cover hingedly secured to the base to be selectively closed and opened thereupon, the cover comprising a plug assembly having a prong portion opposite the jack; and c) a pair of conductive contacts provided on the cover to be received within the jack when the cover is closed onto the base, each being recessed within a cavity that is open to the exterior of the cover for providing a test contact against which a test probe may be placed to detect an electrical signal indicative of the telephone wiring connection established by the wire termination device, each conductive contact having a conductive portion for making an electrical connection with one of the tip and ring contacts while the cover is in a closed position;

d) wherein each of the conductive contacts comprises a bypass contact that is disposed upon an outer surface of the prong portion and positioned to avoid contact with the tip and ring contacts; and e) wherein the jack has a pair of conductive members therein that are engaged by the bypass contacts when the cover is closed, the conductive members being electrically connected to the tip and ring contacts.

12. The wire termination device of claim 11 wherein each of the conductive contacts comprises a metallic strip extending upwardly from the prong portion of the plug assembly to present the test contact proximate an upper portion of the plug assembly.

13. A wire termination device comprising:

a) a base having a telephone jack with tip and ring contacts for establishing a telephone wiring connection;

b) a cover hingedly secured to the base to be selectively closed and opened thereupon, the cover comprising a plug assembly having a prong portion opposite the jack; and c) a pair of conductive contacts provided on the cover to be received within the jack when the cover is closed onto the base, each being recessed within a cavity that is open to the exterior of the cover for providing a test contact against which a test probe may be placed to detect an electrical signal indicative of the telephone wiring connection established by the wire termination device, each conductive contact having a conductive portion for making an electrical connection with one of the tip and ring contacts while the cover is in a closed position;

d) wherein each of the conductive contacts comprises a metallic strip disposed along a lateral side of the prong portion and having a contacting portion that is biased outwardly from the lateral side of the prong portion; and e) wherein the jack has a conductive member on a lateral sidewall that is engaged by the metallic strip when the cover is closed, the conductive member being electrically connected to one of the tip and ring contacts.

14. The wire termination device of claim 13 wherein each metallic strip extends upwardly from the prong portion of the plug assembly to present the test contact proximate an upper portion of the plug assembly.

* * * * *